United States Patent [19]

van der Eerden

[11] Patent Number: 4,646,384
[45] Date of Patent: Mar. 3, 1987

[54] GUIDE TRACK FOR SLAUGHTERED POULTRY

[75] Inventor: Henricus F. J. M. van der Eerden, Boxtel, Netherlands

[73] Assignee: Stork PMT B.V., Boxmeer, Netherlands

[21] Appl. No.: 714,830

[22] Filed: Mar. 22, 1985

[30] Foreign Application Priority Data

Mar. 22, 1984 [NL] Netherlands ............... 8400919

[51] Int. Cl.4 .................................. A22C 21/00
[52] U.S. Cl. ................................. 17/11; 17/44.1
[58] Field of Search ............. 17/11, 44.1, 44, 44.2

[56] References Cited

U.S. PATENT DOCUMENTS

| 2,438,608 | 3/1948 | Johnson | 17/44.1 |
| 2,557,707 | 6/1951 | Utter | 17/44.1 X |
| 4,272,863 | 6/1981 | Parker, Jr. | 17/44.1 |

Primary Examiner—Willie G. Abercrombie
Attorney, Agent, or Firm—Edmund M. Jaskiewicz

[57] ABSTRACT

A guide track for slaughtered poultry, which poultry is moved forward along this track, under the action of a driver, hanging down and with at least one leg supported by the guide track, in which the leg supports are formed by on the one hand a guide and on the other hand a support edge located opposite the guide and formed on the drive.

8 Claims, 14 Drawing Figures

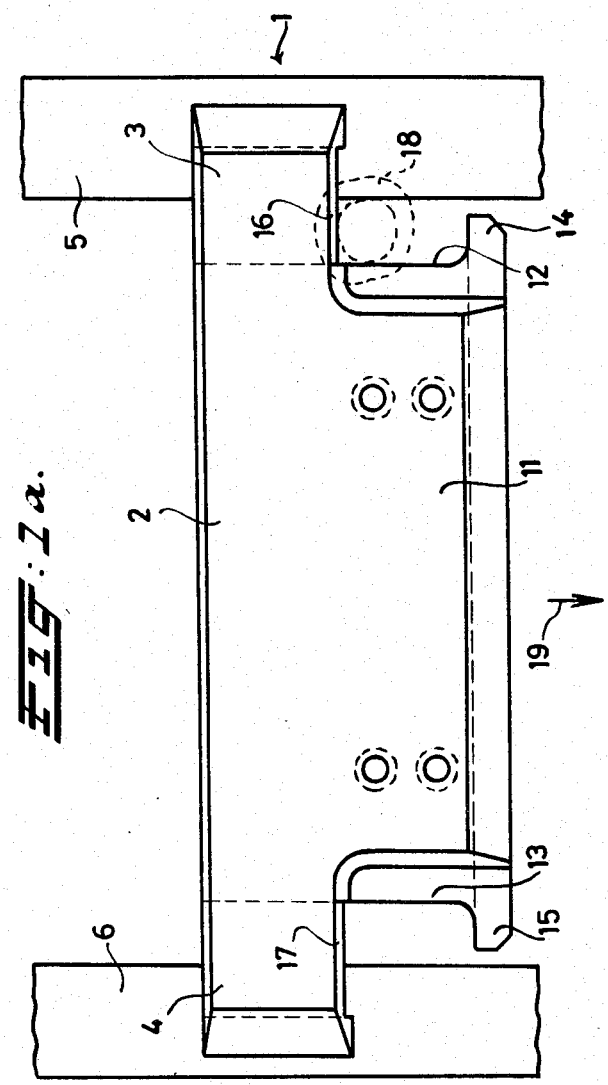
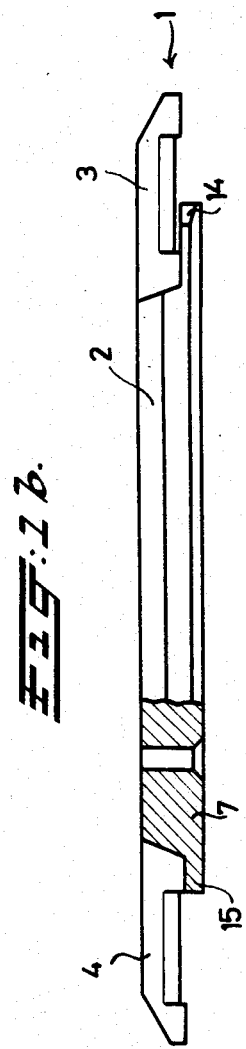

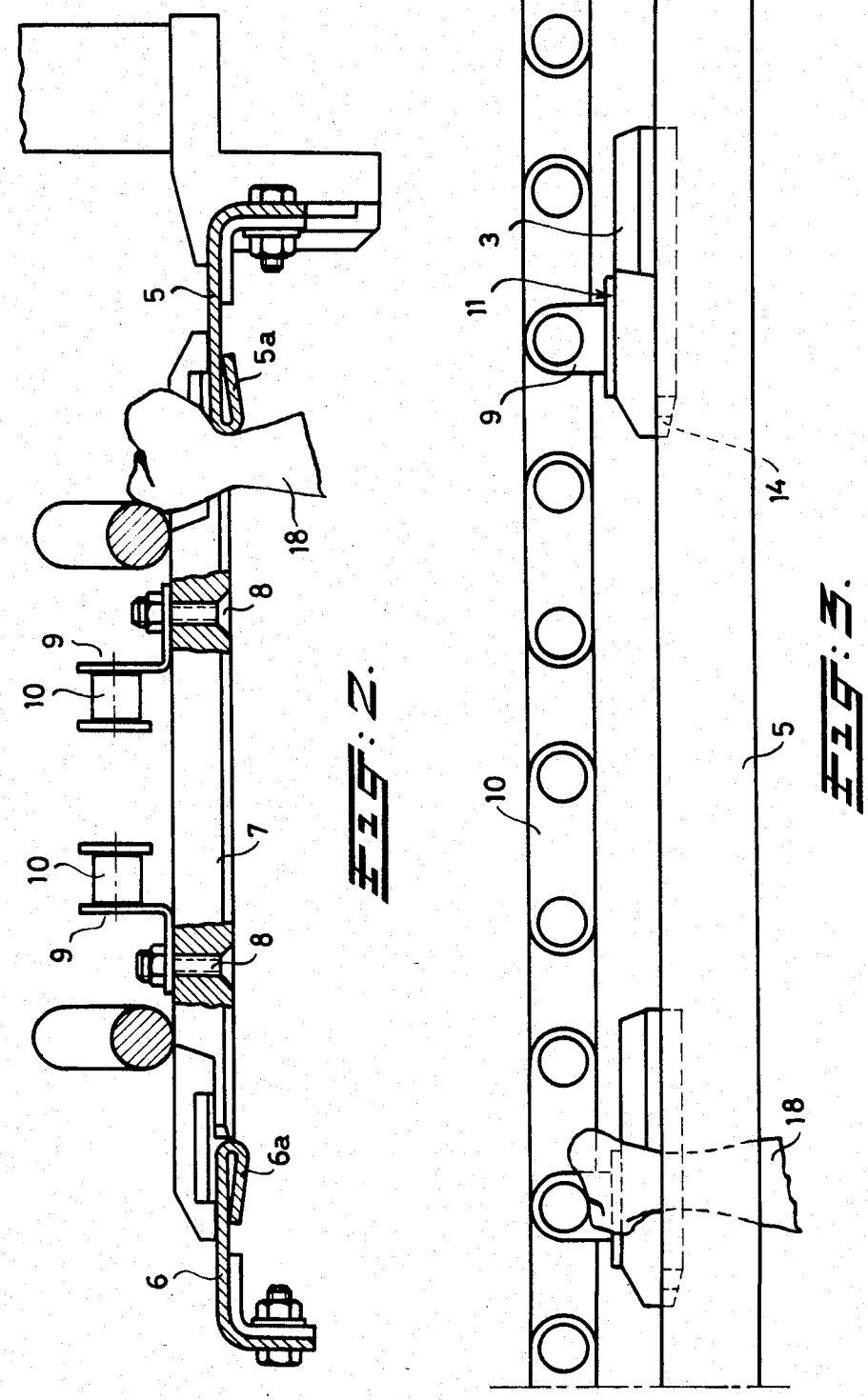

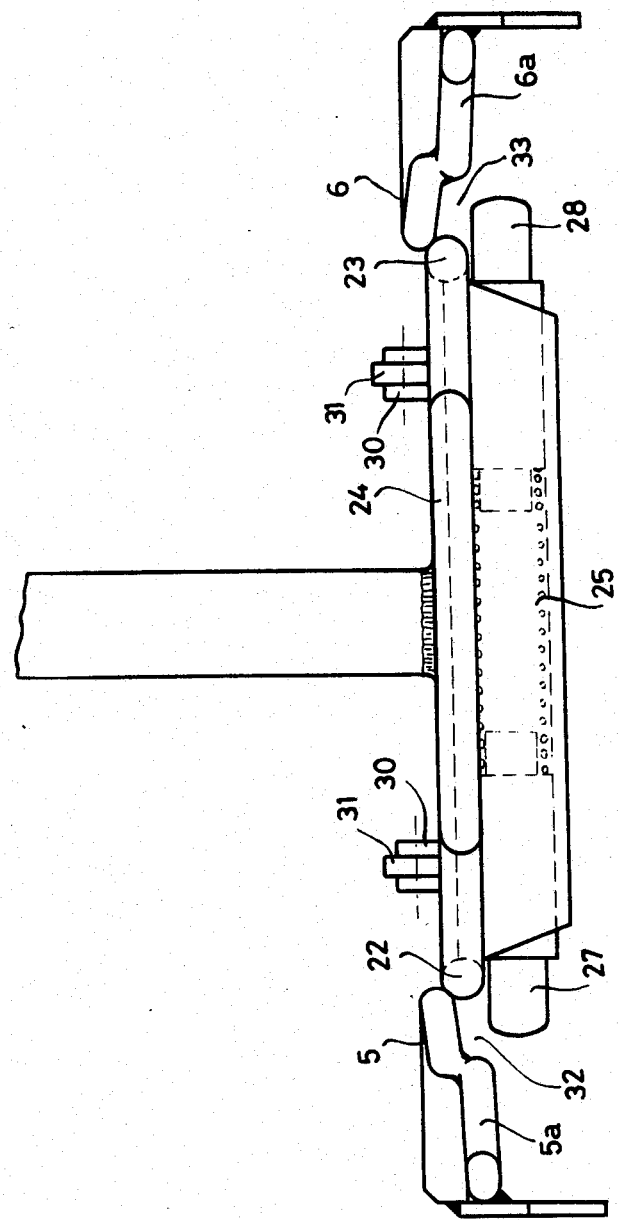

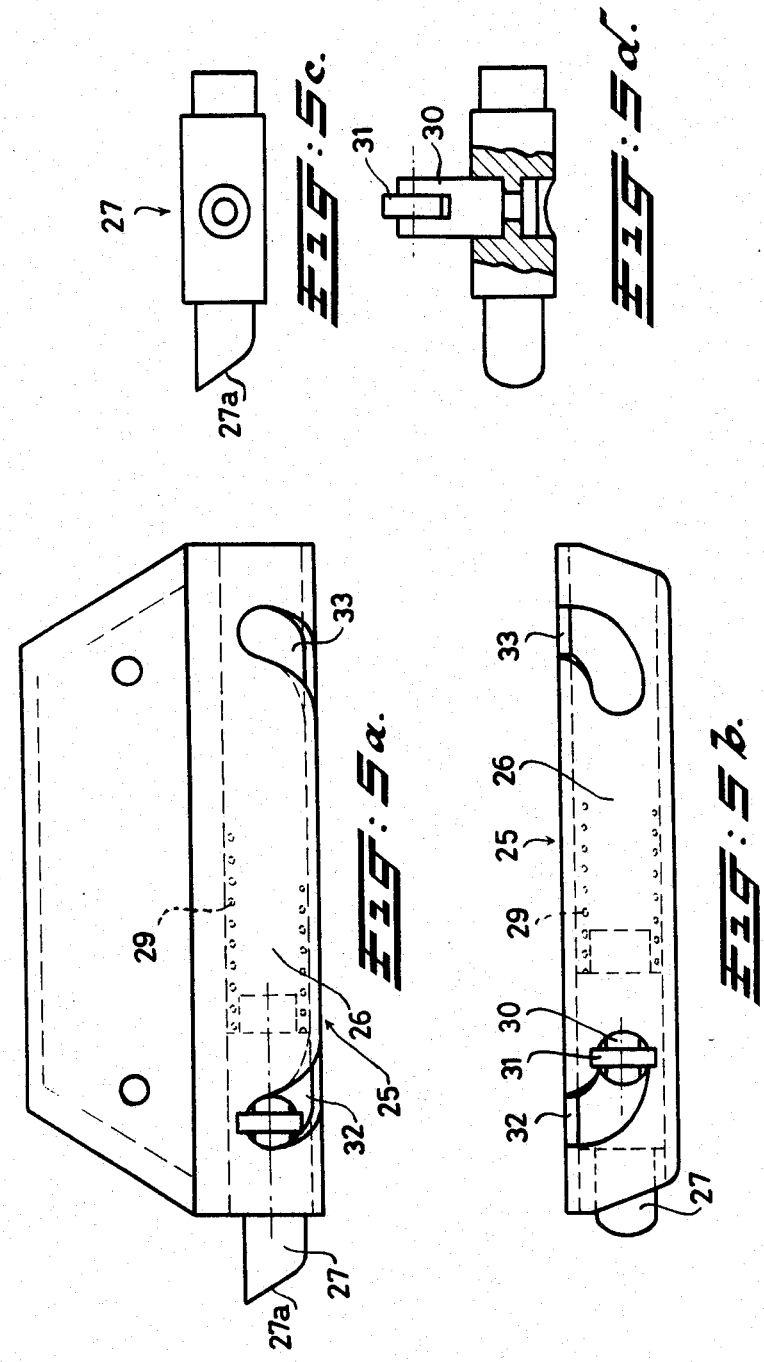

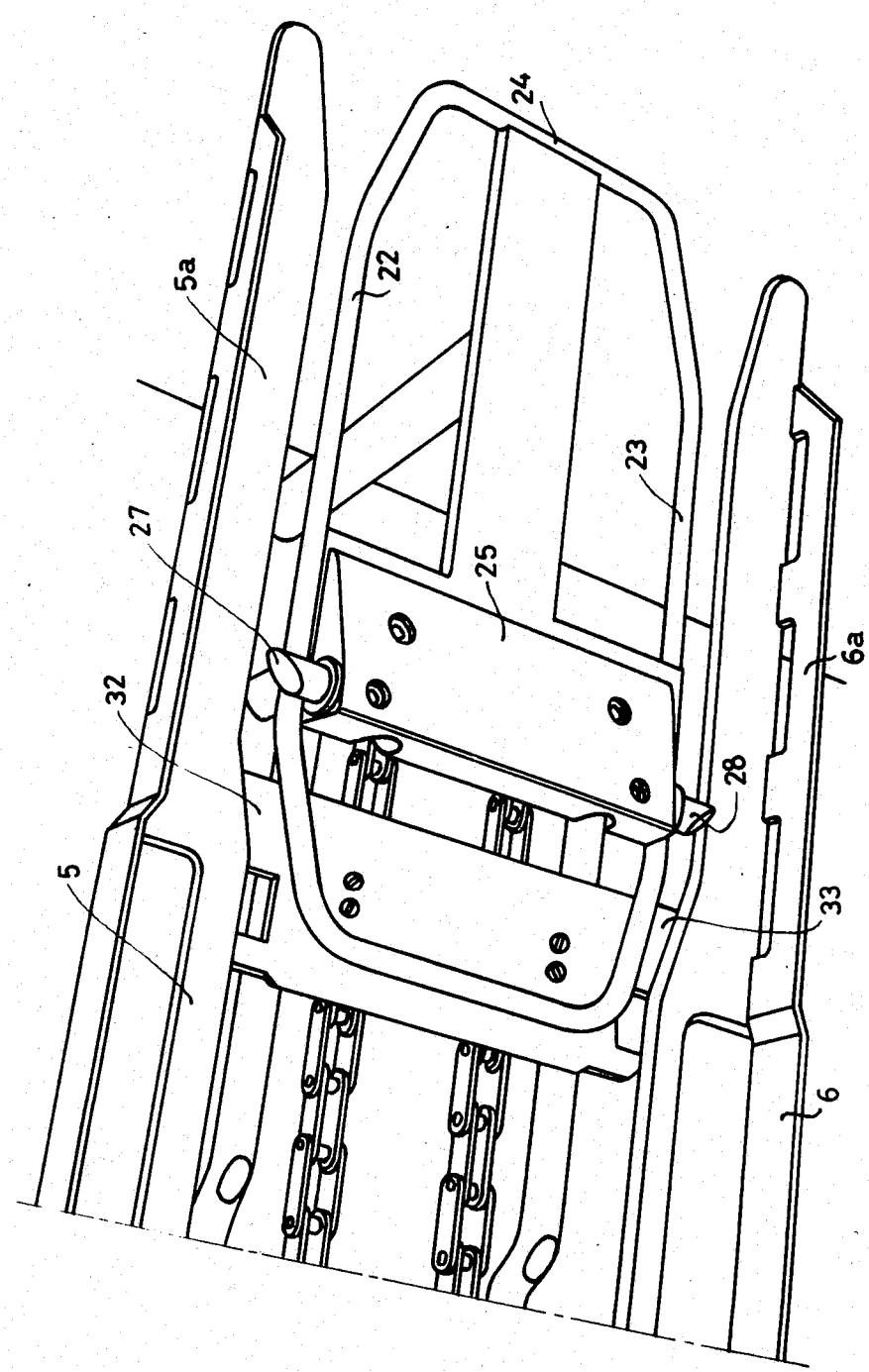

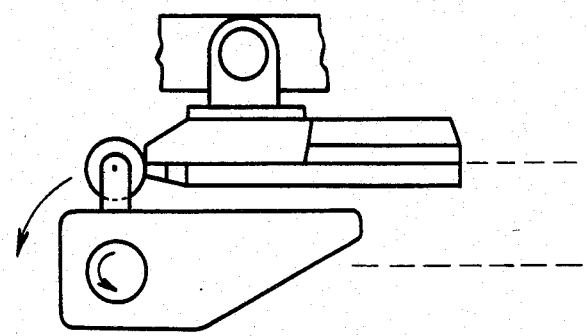
FIG: 7a.
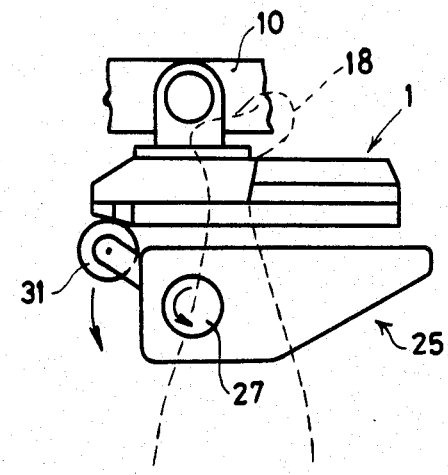
FIG: 7b.
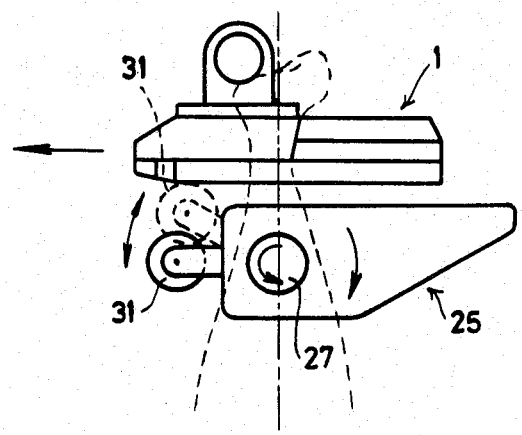
FIG: 7c.

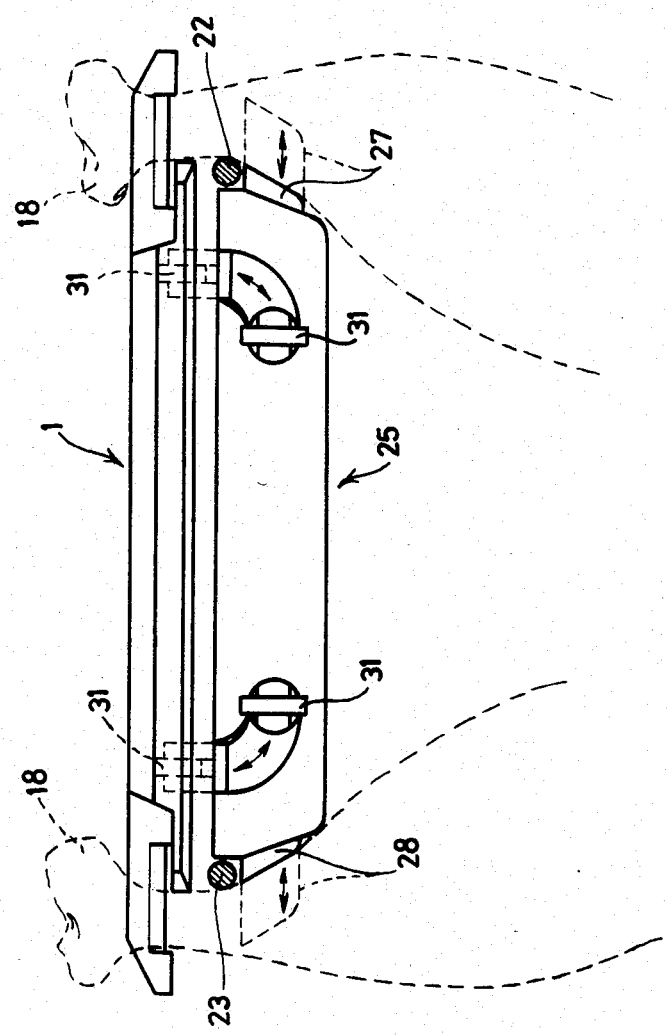

GUIDE TRACK FOR SLAUGHTERED POULTRY

BACKGROUND OF THE INVENTION

The invention relates to a guide track for slaughtered poultry, which poultry is moved forward along this track, under the action of a driver, hanging down and with at least one leg supported by the guide track.

DESCRIPTION OF THE PRIOR ART

A guide track of this type is described in non-published Netherlands Patent Application No. 8204464. In this known guide track each leg is clamped between two elongate guides so that four guides and two drivers are required for the transport of poultry which is suspended on both legs.

The invention aims at simplifying the guide track while maintaining its good and reliable operation. This object is achieved, according to the invention, in that the leg supports are formed, on the one hand, by a guide and, on the other hand, a support edge formed on a driver and located opposite the guide.

Since half the number of guides otherwise necessary can be dispensed with and at the same time the driving of the drivers can be effected more easily, the resulting device is cheaper but just as reliable in operation.

Preferably, each support edge merges at its end in a support edge directed towards the guide cooperating therewith. This measure provides that the leg of the bird is clamped on all sides so that, even when it is subjected to tensile forces, as can be the case for example during the execution of manipulations on the bird, the latter cannot become free from the support.

In an embodiment having two fixed guides and drivers acting upon the two legs, the structure is preferably such that each driver bridges the distance between two guides and is provided with two support edges directed towards the respective guides.

To achieve reliable and good introduction of the birds into the guide track use is preferably made of a stop element for the legs of the birds, which stop element is inserted between the guides and consists of a fixed housing having blocking pins which are displaceable along either side of the housing in the longitudinal direction in the latter and as far as feed guides which are mounted in the space between the guides and parallel thereto and which each carry a radially extending control cam, guided in the guide groove which is formed in the housing wall and which extends in the peripheral and longitudinal directions of the housing and cooperating with a driver, such that displacement of the control cam under the action of a driver in the direction of movement of the poultry brings about axial displacement of the blocking pins directed towards the centre of the housing.

SURVEY OF THE DRAWINGS

FIG. 1a is a top view of a driver used with the guide track according to the invention;

FIG. 1b is a front view of a driver of this type;

FIG. 2 shows a front view of a driver in combination with two guides;

FIG. 3 is a diagrammatic side view of a part of the guide track according to the invention;

FIG. 4 is a front view of a stop element used, according to the invention, in the guide track;

FIG. 5a is a view, partially top view and partially in cross-section, of the housing used in the stop element;

FIG. 5b is a view, partially front view and partially in cross-section, of this housing;

FIG. 5c is a side view of a blocking pin used with the stop element;

FIG. 5d is a top view of this pin;

FIG. 6 is a bottom view of the feed part with the stop element of the guide track according to the invention.

FIG. 7a is a side elevational view of the driver and stop housing illustrating the driver in contact with the guide wheel of the control cam;

FIG. 7b is a side elevational view similar to that of FIG. 7a but showing further movement of the guide wheel under the action of the moving driver;

FIG. 7c is a view similar to that of FIG. 7a but showing the guide wheel in the fully depressed position under the action of the moving driver;

FIG. 8 is a front elevational view of the stop housing and driver with the guide wheel being in the position as shown in FIG. 7c.

DESCRIPTION OF A PREFERRED EMBODIMENT

The driver shown in the figures is indicated in its entirety by reference numeral 1 and consists in the embodiment shown of the body part 2, of which the end parts, 3, 4 which project on both sides are supported on the fixed guides 5 and 6 respectively during operation. In the embodiment shown (see also FIG. 2) these guides are made of sheet material having reversed end edges 5a, 6a; it is, however, also possible to use solid guides having a different cross-section.

The thickened driver part 7 fits in the space between the guides 5, 6 so that the driver is protected against displacement in the transverse direction.

By means of bolts 8 and angle pieces 9, each driver is suspended on two transport chains 10 by means of which the drivers are moved forward along the guide track.

The body part 2 continues in a narrowed part 11 having two support edges 12, 13, which are directed towards the respective guides 5, 6 which are continued in a hook-shaped part 14 and 15 respectively. Support edges 16 and 17 respectively extending transversely on the support edges 12 and 13 respectively complete the rest area for the leg 18 of the poultry to be transported along the guide track.

This leg 18 is, as shown in the figures, clamped between on the one hand a guide 5 and 6 respectively and on the other hand the support edges 16 and 17 and 12 and 13 respectively. As a result of the presence of the hook-shaped parts 14 and 15 respectively the leg is clamped on all sides, so that, when the bird is subjected to stresses in the direction of forward movement indicated by the arrow 19, as a result of which the bird is carried along so to speak by the driver, the bird cannot escape from the rest areas.

A guide track of the type described above will, as is the known guide track, be used in a device in which the poultry is subjected to certain operations and in which the poultry is introduced on one side and removed again on the other side; the chains to which the drivers are fastened are endless chains which are passed over deflecting rollers on the inlet and outlet ends of the operating device. The birds then have to be introduced one by one into the guide track and are, after the introduction, carried along by the drivers.

The invention provides a device by means of which this introduction is made easier and with which it is guaranteed that both legs are always gripped by the drivers. A device of this type is formed by a stop element for the legs of the poultry, the stop element having blocking pins which, in combination with a feed track, alternately lock and release respectively the track for the poultry.

Details of this device are shown in FIGS. 4 up to and including 6. FIGS. 4 and 6 show the inlet ends 5a and 6a respectively of the guides 5 and 6 respectively with the feed guides 22 and 23 respectively located in-between, connected on the front side by transverse piece 24. The stop housing 25 containing the bore 26 is mounted between the guides 22, 23, which bore contains two blocking pins 27 and 28 respectively each having a chamfered end 27a and 28a respectively. They are under the action of a pressure spring 29 and each carry a control cam 30 standing transversely on the longitudinal axis of the latter and having a guide wheel 31; the control cams are guided in grooves 32 and 33 which are formed in the front edge of the housing 25; the grooves extend through an angle of about 90° and from the outside towards the inside.

Consequently, rotation of a stop cam 30 through 90° should have the result that the blocking pins are brought from the position in which they project out of the housing to the position in which they are pulled back, and vice versa. The movement from the projecting (blocking) position to the pulled-back (release) position occurs when one driver passes over the stop housing and thereby pushes the cams 30 forwards via the rollers 31; the returning movement towards the initial position occurs after the driver has been passed under the action of the spring 29.

The device operates as follows:

The operator of an automatic feed mechanism brings the legs of the bird between feed guide 22 and guide part 5a and respectively feed guide 23 and guide part 6a, whereby the bird is pushed forward as far as possible, i.e. against blocking pins 27 and 28 projecting from the track of the legs. A subsequently passing driver 1 presses by means of its front edge, via the rollers 31, the cams 30 down, as a result of which the blocking pins 27, 28 are pulled inwards and the support edges 16, 17 carry the bird along. Since the distance between the guides decreases shortly after the blocking pins 27, 28, i.e. at position 32, 33 in the transition between feed guide parts 5a and 6a respectively and the guides 5 and 6 respectively, each leg is positively pushed in the rest area provided for this purpose.

What is claimed is:

1. In a guide track upon which slaughtered poultry is moved along under the action of a driver, a fixed elongate guide, a driver movable upon said guide, said driver having a first support edge spaced from and substantially parallel to said guide, said first support edge so spaced from said guide to define a leg support area for one leg of a fowl hanging downwardly, said driver having a portion thereof engageable with said leg in said leg support area to move said leg and fowl along in said leg support area when said driver moves along said guide, said leg being clamped between said guide, said first support edge and said portion of said driver.

2. In a guide track according to claim 1, in which said first support edge has an end merging into said driver portion which is directed towards the guide cooperating therewith.

3. In a guide track according to claim 2, having two fixed guides and said driver acting upon the two legs of a fowl, said driver bridging the distance between two guides and having two support edges spaced from the respective guides.

4. In a guide track according to claim 3, in which the driver rests on the guides.

5. In a guide track according to claim 3 comprising a stop element for the legs of the birds inserted between the guides, said stop element comprising a fixed housing having blocking pins which are displaceable along either side of the housing in the longitudinal direction of the latter and as far as feed guides which are mounted in the space between the guides and parallel thereto, each blocking pin having a radially extending control cam, guided in a guide groove which is formed in the housing wall and which extends in the peripheral and longitudinal directions of the housing, said control cam cooperates with a driver in such a way that displacement of the control cam under the action of a driver in the direction of movement of the poultry brings about axial displacement of the blocking pins towards the centre of the housing.

6. In a guide track according to claim 5, in which each blocking pin is urged away from the center of the housing by a pressure spring.

7. In a guide track as claimed in claim 2, wherein said driver portion comprises a second support edge substantially transverse to the direction of movement of said driver and extending toward the guide.

8. In a guide track as claimed in claim 7, wherein said first support edge has a second end merging into a hook portion directed towards said guide and spaced forwardly of said second support edge.

* * * * *